(12) United States Patent
Park

(10) Patent No.: US 8,341,456 B2
(45) Date of Patent: Dec. 25, 2012

(54) METHOD AND APPARATUS OF RECORDING DATA ON WRITE-ONCE RECORDING MEDIUM

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 427 days.

(21) Appl. No.: 11/203,111

(22) Filed: Aug. 15, 2005

(65) Prior Publication Data

US 2006/0034411 A1    Feb. 16, 2006

Related U.S. Application Data

(60) Provisional application No. 60/601,621, filed on Aug. 16, 2004.

(30) Foreign Application Priority Data

Oct. 25, 2004 (KR) .......................... 10-2004-0085290

(51) Int. Cl.
*G06F 11/00* (2006.01)
(52) U.S. Cl. ....... 714/6.1; 714/6.11; 714/6.12; 714/6.13
(58) Field of Classification Search ............... 714/8, 6.1, 714/6.11, 6.12, 6.13
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi | |
| 4,807,205 A | 2/1989 | Picard | |
| 4,963,866 A | 10/1990 | Duncan | |
| 5,051,849 A | 9/1991 | Fukushima et al. | |
| 5,068,842 A | 11/1991 | Naito | |
| 5,111,444 A * | 5/1992 | Fukushima et al. | 369/53.17 |

(Continued)

FOREIGN PATENT DOCUMENTS

CN    1134017    10/1996

(Continued)

OTHER PUBLICATIONS

International Search Report dated Jan. 13, 2006.

(Continued)

*Primary Examiner* — Scott Baderman
*Assistant Examiner* — Jigar Patel
(74) *Attorney, Agent, or Firm* — Harness, Dickey & Pierce, P.L.C.

(57) ABSTRACT

An apparatus of recording data on a recording medium includes an optical recording device and a microcomputer. The recording medium has a lead-in area, a lead-out area, and a data zone, where the data zone has a user data area and a spare area. When the microcomputer receives a command for physically overwriting first data in a first area within the user data area and determines that the first area is included in a pre-recorded area, it controls the recording device to record the first data in a first replacement area instead and to record a first entry in a TDMA, where the first entry specifies the locations of the first area and the first replacement area. In addition, when the microprocessor receives a command for recording second data in a second area within the user data area and finds the second area defective, it controls the optical recording device to record the second data in a second replacement area instead and to record a second entry in the TDMA, where the second entry specifies the locations of the second area and the second replacement area.

22 Claims, 10 Drawing Sheets

- ISA : Inner Spare Area
- OSA : Outer Spare Area
- DMA : Defect Management Area
- DFL : Defect List

U.S. PATENT DOCUMENTS

| | | | |
|---|---|---|---|
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,633,764 A | 5/1997 | Ohta |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,890,206 A * | 3/1999 | Koike ........................... 711/112 |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,957,360 B2 | 10/2005 | Sims, III et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 7,483,349 B2 | 1/2009 | Park et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0156471 A1 | 8/2003 | Ueda et al. |
| 2003/0173669 A1 | 9/2003 | Shau |
| 2003/0198155 A1 | 10/2003 | Go et al. |
| 2003/0223327 A1 | 12/2003 | Lee et al. |
| 2003/0237024 A1 | 12/2003 | Ogawa et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 * | 6/2004 | Park et al. .................. 369/47.13 |
| 2004/0125715 A1 | 7/2004 | Lee et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 * | 8/2004 | Park et al. ......................... 714/7 |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179455 A1 | 9/2004 | Maruyama et al. |
| 2004/0179458 A1 | 9/2004 | Hwang et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |

| Publication No. | Date | Name |
|---|---|---|
| 2005/0083804 A1 * | 4/2005 | Hwang et al. ............... 369/47.22 |
| 2005/0083830 A1 | 4/2005 | Martens et al. |
| 2005/0169133 A1 | 8/2005 | Hwang et al. |
| 2005/0185551 A1 | 8/2005 | Hwang et al. |
| 2005/0195716 A1 | 9/2005 | Ko et al. |
| 2005/0207262 A1 | 9/2005 | Terada et al. |
| 2005/0265191 A1 | 12/2005 | Hwang et al. |
| 2005/0289389 A1 | 12/2005 | Yamagami et al. |
| 2006/0077827 A1 | 4/2006 | Takahashi |
| 2006/0171280 A1 | 8/2006 | Chiang et al. |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2007/0211591 A1 | 9/2007 | Park et al. |
| 2007/0294571 A1 | 12/2007 | Park et al. |
| 2008/0046780 A1 | 2/2008 | Shibuya et al. |
| 2009/0175141 A1 | 7/2009 | Park et al. |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1652217 | 8/2005 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 464 811 | 1/1992 |
| EP | 0 472 484 | 2/1992 |
| EP | 0 477 503 | 4/1992 |
| EP | 0 556 046 | 8/1993 |
| EP | 0 871 172 | 10/1998 |
| EP | 0908882 | 4/1999 |
| EP | 0952573 | 10/1999 |
| EP | 0 974 967 | 1/2000 |
| EP | 0 989 554 | 3/2000 |
| EP | 0 997 904 | 5/2000 |
| EP | 1 026 681 | 8/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 564 740 | 8/2005 |
| EP | 1560216 | 8/2005 |
| EP | 1612790 | 1/2006 |
| GB | 2 356 735 | 5/2001 |
| JP | 63-091842 | 4/1988 |
| JP | 1-263955 | 10/1989 |
| JP | 2-023417 | 1/1990 |
| JP | 5-274814 | 10/1993 |
| JP | 6-349201 | 12/1994 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11039801 A | 2/1999 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2004171714 | 6/2004 |
| JP | 2004-280864 | 10/2004 |
| JP | 2004-280865 | 10/2004 |
| JP | 2005-004912 | 1/2005 |
| JP | 2005196903 | 7/2005 |
| JP | 2005-535993 | 11/2005 |
| JP | 2005-538490 | 12/2005 |
| JP | 2005-538491 | 12/2005 |
| JP | 2005339773 | 12/2005 |
| JP | 2006512699 T | 4/2006 |
| JP | 2006513519 T | 4/2006 |
| JP | 2006-519445 | 8/2006 |
| KR | 2004-0065004 | 7/2004 |
| KR | 10-2004-0094301 | 11/2004 |
| KR | 2005-0085444 | 8/2005 |
| TW | 371752 | 10/1999 |
| TW | 413805 | 12/2000 |
| TW | 413806 B | 12/2000 |
| TW | 509931 B | 11/2002 |
| TW | 527583 B | 4/2003 |
| TW | 200406001 A | 4/2004 |
| WO | WO 84/00628 | 2/1984 |
| WO | WO 96/30902 | 10/1996 |
| WO | WO 97/22182 | 6/1997 |
| WO | WO 00/07185 | 2/2000 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 2003/007296 | 1/2003 |
| WO | WO 03/025924 | 3/2003 |
| WO | WO 03/079353 | 9/2003 |
| WO | WO 03/105141 | 12/2003 |
| WO | WO 2004/015707 | 2/2004 |
| WO | WO 2004/015708 | 2/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/068477 | 8/2004 |
| WO | WO 2004/075180 | 9/2004 |
| WO | WO 2004/079631 | 9/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |
| WO | WO 2005/006315 | 1/2005 |
| WO | WO 2005/109432 | 11/2005 |

OTHER PUBLICATIONS

"JIS Handbook Data Processing for Hardware," Japanese Standards Association Inc., Japan, Apr. 21, 1999, pp. 1064-1070.

International Search Report and Written Opinion dated Aug. 31, 2004.

International Search Report and Written Opinion dated Jan. 13, 2006.

International Search Report and Written Opinion dated Mar. 8, 2007.

United States Office Action dated May 7, 2004.
United States Office Action dated May 10, 2004.
United States Office Action dated May 9, 2007.
United States Office Action dated Jun. 24, 2008.
United States Office Action dated Jul. 7, 2008.
United States Office Action dated Jul. 30, 2008.
United States Office Action dated Jul. 25, 2008.
Russian Office Action dated Jun. 26, 2008 with English translation.
European Search Report dated Jun. 5, 2008.
European Search Report dated Mar. 4, 2009.
United States Notice of Allowance dated Jun. 10, 2009.
Russian Decision on Grant dated Oct. 19, 2009 with English translation.
United States Notice of Allowance dated Dec. 1, 2009.
English translation of Chinese Office Action dated Feb. 5, 2010 for corresponding Chinese Application No. 200680039631.8.
Notice of Allowance for corresponding Korean Application No. 10-2004-0085290 dated Jan. 17, 2011.
Japanese Office Action dated Oct. 22, 2010 in corresponding Japanese Application No. 2008-542224.
English Translation of Russian Office Action dated Aug. 30, 2010 in corresponding Russian Application No. 2008125856.
Japanese Office Action dated Nov. 30, 2010 in corresponding Japanese Application No. 2007-527037.
Japanese Office Action dated Dec. 21, 2010 in corresponding Japanese Application No. 2007-524746.
European Office Action dated Aug. 4, 2011 for Application 05771070.9-1247/1779380 PCT/KR2005002646.
White Series No. 218 DVD +RW/+R, 635070, Jan. 22, 2002, ISBN4-88657-218-9, pp. 77-85 (with English translation of pp. 83-84).
JIS 80 mm (1.23 GB), 120 mm (3.95 GB), 635071 (English translation).
European Search Report for European Patent Application No. EP 06812323.1 dated May 10, 2012.
Taiwanese Office Action dated Aug. 9, 2012 for corresponding Taiwanese Application No. 094127936 (full translation provided).

* cited by examiner

FIG. 4

| $b_{63}\cdots b_{60}$ | $b_{59}$ | . . . | $b_{32}$ | $b_{31}\cdots b_{28}$ | $b_{27}$ | . . . | $b_0$ |
|---|---|---|---|---|---|---|---|
| Staus 1 | Defective Cluster first PSN | | | Staus 2 | Replacement Cluster first PSN | | |

| Staus 1 | Staus 2 | Staus 3 |
|---|---|---|
| 0000 | 0000 | RAD |
| 0000 | 0001 | CRD |
| 0000 | 0010 | CRD |
| 0001 | 0000 | NRD |

FIG. 5

| $b_{63} \cdots b_{60}$ | $b_{59}$ | $\cdots$ | $b_{32}$ | $b_{31} \cdots b_{28}$ | $b_{27}$ | $\cdots$ | $b_0$ |
|---|---|---|---|---|---|---|---|
| Staus 1 | Original Cluster first PSN | | | Staus 2 | Replacement Cluster first PSN | | |

| Status 1 | Define Low entires by using status 1 bits = "1000" |
|---|---|
| Status 2 | "X000" = RAD<br>"X001" = CRD(start of LOW)<br>"X010" = CRD(end of LOW)<br><br>"0xxx" = Replacement Cluster is in the User Data Area<br>"1xxx" = Replacement Cluster is in the Spare Area |

FIG. 7

| Byte position in Data Frame | Contents | Number of bytes |
|---|---|---|
| 0 | DFL identifier="DL" | 2 |
| 2 | DFL format = 00h | 1 |
| 3 | reserved | 1 |
| 4 | DFL Update Count | 4 |
| 8 | reserved | 4 |
| 12 | number of DFL entries(N_DFL) | 4 |
| 16 | number of RAD/CRD entries | 4 |
| 20 | number of NRD entries | 4 |
| 24 | number of LOW entries(N_LOW) | 4 |
| 28 | reservd | 36 |

FIG. 8

| $b_{63}\cdots b_{60}$ | $b_{59}$ | . | . | . | . | . | $b_{32}$ | $b_{31}$ | $\cdots$ | $b_{28}$ | $b_{27}$ | . | . | . | . | . | $b_0$ |
|---|---|---|---|---|---|---|---|---|---|---|---|---|---|---|---|---|---|
| Staus 1 | Original Cluster first PSN | | | | | | | Staus 2 | | | Replacement Cluster first PSN | | | | | | |

| Status 1 | Define Low entires by using status 1 bits = "1111" |
|---|---|
| Status 2 | "X000"=RAD<br>"X001"=CRD(start of LOW)<br>"X010"=CRD(end of LOW)<br><br>"0xxx"=Replacement Cluster is in the User Data Area<br>"1xxx"=Replacement Cluster is in the Spare Area |

METHOD AND APPARATUS OF RECORDING DATA ON WRITE-ONCE RECORDING MEDIUM

This application claims the benefit of the Korean Patent Application No. 10-2004-0085290, filed on Oct. 25, 2004, which is hereby incorporated by reference as if fully set forth herein.

This application claims the benefit of the U.S. Provisional Application No. 60/601,621, filed on Aug. 16, 2004, in the name of inventor Yong Cheol PARK, entitled "PHYSICAL/LOGICAL OVERWRITE METHOD IN BD-R", which is hereby incorporated by reference as if fully set forth herein.

BACKGROUND OF THE INVENTION

1. Field of the Invention

The present invention relates to an optical disc, and more particularly, to a method and apparatus of recording data on a recording medium. Although the present invention is suitable for a wide scope of applications, it is particularly suitable for differentiating and managing LOW and DFL entries, so as to enhance recording and reproducing efficiency of data.

2. Discussion of the Related Art

Recently, a new type of high density optical disc, such as a Blu-ray RE-writable disc (BD-RE), that can record and store high definition audio and video data for a long period of time is expected to be developed and introduced to the recording medium industry and market. As shown in FIG. 1, the BD-RE is allocated with a lead-in area, a data zone, and a lead-out area. An inner spare area (ISA) and an outer spare area (OSA) are respectively allocated at a fore end and a rear end of the data zone. The BD-RE is recorded in cluster units, which correspond to a predetermined recording unit. Referring to FIG. 1, whether or not a defect area exists within the data zone can be detected during the recording of the data. When a defect area is detected, a series of replacement recording operations is performed, such as replacement recording the data that is intended to be recorded in the defect area in a spare area (e.g., the inner spare area (ISA)). Then, a position information of the detected defect area and a position information of the replacement recorded spare area are recorded and stored in a defect list (DFL) within the lead-in area as management information.

Therefore, since the data that is to be recorded in the defect area is replacement recorded in the spare area, the data replacement recorded in the spare area is read and reproduced, instead of the data of the defect area, thereby preventing in advance a data recording/reproducing error from occurring. Meanwhile, the recordable blu-ray disc (BD-R) has recently been under development. However, since data can only be recorded once in the entire area of the optical disc, unlike the re-writable optical disc, data cannot be physically overwritten in the recordable optical disc. Nevertheless, there may occur instances in the recordable optical disc, where the recorded data is wished to be edited or partially modified, and, for simplicity of usage from the part of the host or the user, overwriting of the data may be required. Accordingly, a method for managing defect areas in the above-described recordable optical disc is required, and so an efficient method enabling such defect management and overwriting to be performed is urgently required.

SUMMARY OF THE INVENTION

Accordingly, the present invention is directed to a method and apparatus of recording data on a recording medium that substantially obviate one or more problems due to limitations and disadvantages of the related art.

An object of the present invention is to provide an efficient linear replacement method for overwriting data and managing defect areas on an optical recording medium, such as the optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording data on a recording medium having a lead-in area, a lead-out area, and a data zone, the data zone having a user data area and a spare area, includes recording first data in a first replacement area when a command for physically overwriting the first data in a first area within the user data area is received and the first area is included in a pre-recorded area, recording a first entry in a temporary disc management area (TDMA), the first entry specifying locations of the first area and the first replacement area, recording second data in a second replacement area when a command for recording the second data in a second area within the user data area is received and the second area is found to be defective, and recording a second entry in the TDMA, the second entry specifying locations of the second area and the second replacement area.

In another aspect of the present invention, an apparatus of recording data on a recording medium having a lead-in area, a lead-out area, and a data zone, the data zone having a user data area and a spare area, includes an optical recording device configured to record data on the recording medium, and a microcomputer providing control signals to the optical recording device to record first data in a first replacement area when a command for physically overwriting the first data in a first area within the user data area is received and the first area is included in a pre-recorded area, and to record a first entry in a temporary disc management area (TDMA), the first entry specifying locations of the first area and the first replacement area, wherein the microprocessor further provides control signals to the optical recording device to record second data in a second replacement area when a command for recording the second data in a second area within the user data area is received and the second area is found to be defective, and to record a second entry in the TDMA, the second entry specifying locations of the second area and the second replacement area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 4 illustrates a DFL entry of the recordable optical disc according to the present invention;

FIG. 5 illustrates a LOW entry of the recordable optical disc according to the present invention;

FIG. 7 illustrates a DFL header of the recordable optical disc according to the present invention;

FIG. 8 illustrates a LOW entry of the recordable optical disc according to another embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
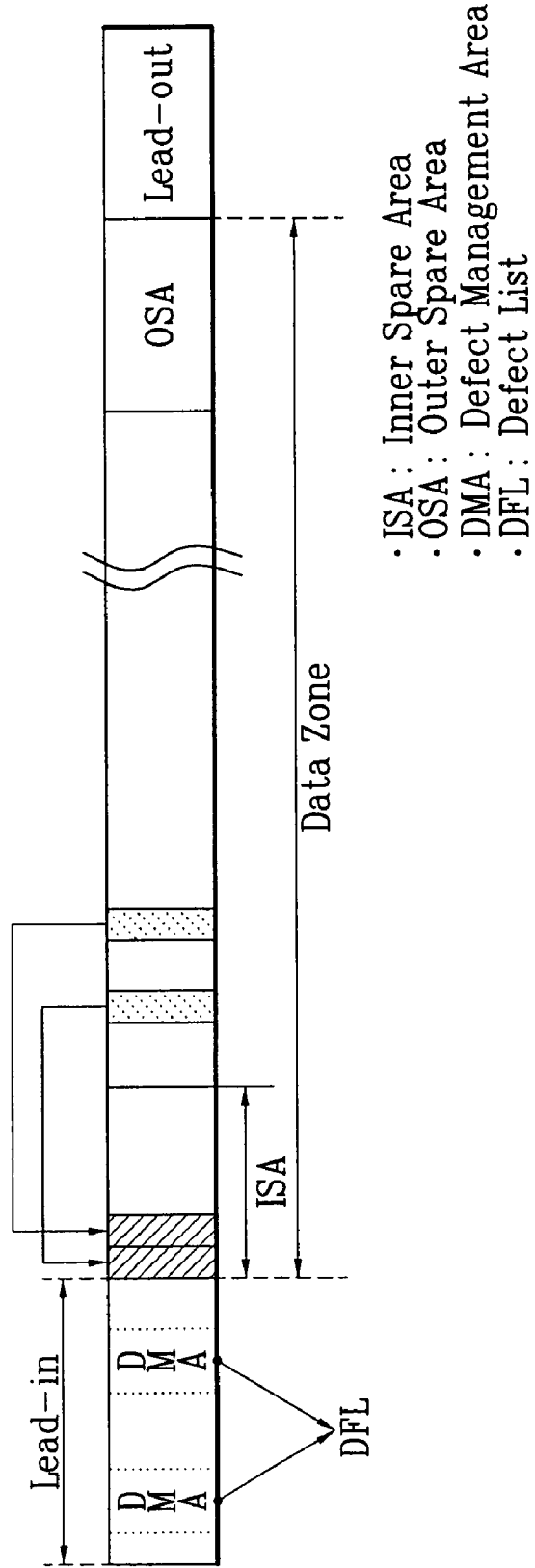
FIG. 1 illustrates a structure of a general re-writable optical disc and a method for managing defects.
Figure 2:
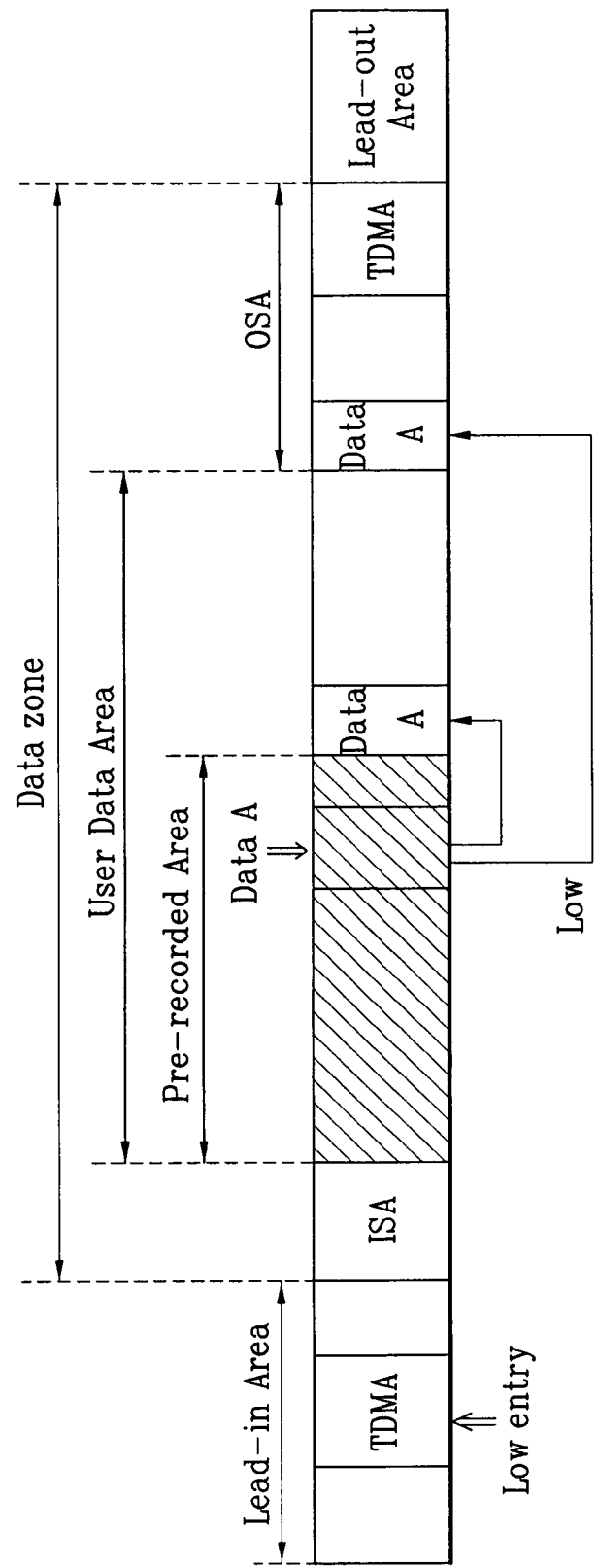
FIG. 2 illustrates a logical overwriting method in a recordable optical disc according to the present invention.

FIG. 2 illustrates a logical overwriting method in a recordable high density optical disc according to the present invention. Referring to FIG. 2, the recordable high density optical disc is allocated with a lead-in area, a data zone, and a lead-out area. Additionally, the data zone includes an inner spare area (ISA), an outer spare area (OSA), and a user data area, wherein actual user data is recorded. Also, the lead-in area is used as an area for recording diverse management information for recording/reproducing data on/from the optical disc. Moreover, the lead-in area is provided with a temporary disc management area (TDMA), which is an area for recording defect management information and recording management information of the optical disc. The TDMA may be allocated with a separate Additional TDMA within a spare area for defects that may frequently occur during the use of the optical disc and for updating the recording management information.

In the recordable write-once optical disc having the above-described structure, a command for writing a new set of data in the user data area in which data is to be recorded may be given (or made) by a user or a host. In this case, due to the characteristic of the recordable optical disc, physical overwriting on a data recorded area within the optical disc is not possible. Therefore, a method of replacement recording the data that is intended to be recorded on the pre-recorded area is performed on the user data area or the spare area. More specifically, instead of overwriting data on the physically non-overwritable pre-recorded area, either a method of replacement recording the data on a next writable (or recordable) user data area or a method of replacement recording the data on the spare area is used. This is referred to as a Logical Overwrite (LOW), which is different from the physical overwriting.

After performing the replacement recording, as described above, information on a replacement recorded position is recorded in the TDMA as an entry information. Therefore, when data is to be reproduced in a later process, reference is made to the entry information recorded in the TDMA so as to reproduce the replacement recorded data. The entry having the position information of the replacement recorded area of the logical overwriting is referred to as a LOW entry. Meanwhile, in the recordable high density optical disc, when a defect is detected while recording or reproducing data, the data that is intended to be recorded in the detected defect area is replacement recorded on the spare area of the optical disc, which is similar to the logical overwriting. The method for replacement recording data is the spare area will now be described in detail with reference to FIG. 3.

Figure 3:
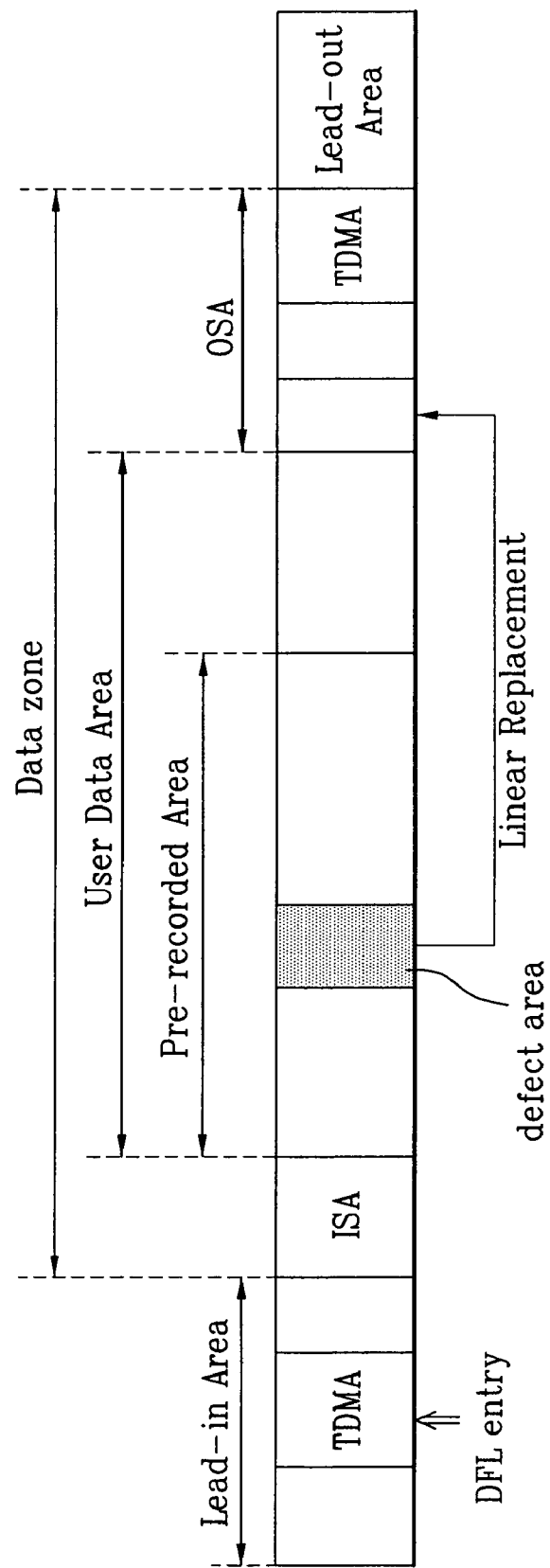
FIG. 3 illustrates a method for managing defects in the recordable optical disc according to the present invention.

FIG. 3 illustrates a method for managing defects in the recordable optical disc according to the present invention. Referring to FIG. 3, in the optical disc having a lead-in area, a data zone, and a lead-out area allocated therein, a defect area may be detected while recording or reproducing data of a user data area within the data zone. At this point, the defect also includes an area that is currently not defective but which may become defective in a near future. The defect area may occur due to contamination or scratch on the surface of the optical disc. And, when such a defect area occurs, the data that is to be recorded on the defect area or a data that is already recorded is replacement recorded on the spare area within the data zone. After replacement recording the data as described above, the position information of the defect area and the replacement recorded area is recorded in the TDMA as a Defect List (DFL) entry. Therefore, when reproducing data in a later process, reference is made to the DFL entry information in order to reproduce the data recorded in the replacement area, thereby ensuring stability of the data.

FIG. 4 illustrates a DFL entry of the recordable optical disc according to the present invention. Referring to FIG. 4, the DFL entry is allocated with a total of 64 bits. 4 bits are allocated to each of a "Status 1" field and a "Status 2" field, which indicate entry status information, 28 bits are allocated to a "Defective Cluster first PSN" field, wherein a first physical sector number (PSN) of a defective cluster is recorded, and 28 bits are allocated to a "Replacement Cluster first PSN" field, wherein a first physical sector number (PSN) of a replacement cluster is recorded. More specifically, the first PSN of the defective cluster is recorded in the "Defective Cluster first PSN" field as the position information of the defect area, and the first PSN of the replacement cluster is recorded in the "Replacement Cluster first PSN" field as the position information of the replacement area in which the data is replacement recorded.

At this point, when the defect area is the size of one cluster, the defect is registered as a Re-Allocated Defect (RAD) type. And, when the defect area is registered as the RAD type, a '0000' bit is recorded in each of the "Status 1" and "Status 2" fields in order to indicate that the defect is an RAD type. Alternatively, when the defect area is the size of a plurality of consecutive clusters, the defect is registered as a Contiguous Re-allocated Defect (CRD) type. And, when the defect area is registered as the CRD type, two DFL entries are used. More specifically, when the defect area is the CRD type, a first PSN of a first defective cluster is recorded in the "Defective Cluster first PSN" field of the first DFL entry, and a first PSN of a first replacement recorded cluster is recorded in the "Replacement Cluster first PSN" field. In addition, a first PSN of the last cluster among the defective clusters is recorded in the "Defective Cluster first PSN" field of the second DFL entry, and a first PSN of the last cluster among the replacement recorded clusters is recorded in the "Replacement Cluster first PSN" field of the second DFL entry.

Therefore, in order to differentiate the CRD types recorded as described above, a '0000' bit indicating that replacement recording has been performed is recorded in the "Status 1" field of the first DFL entry of the CRD type. And, a '0001' bit indicating a start (or beginning) address of the consecutive defective clusters is recorded in the "Status 2" field of the first DFL entry of the CRD type. Furthermore, a '0000' bit indicating that replacement recording has been performed is recorded in the "Status 1" field of the second DFL entry, and a '0010' bit indicating an end address of the consecutive defective clusters is recorded in the "Status 2" field of the second DFL entry.

Meanwhile, when the defect area occurs, the defect area is treated as a Non Re-allocated Defect (NRD) type, which indicates that the defect area is simply notified but replacement recording of the data is not performed. When the defect area is the NRD type, a '0001' bit indicating that replacement recording of the defective cluster has not been performed is recorded in the "Status 1" field. According to the present invention, each of the DFL entries, which may be recorded as described above, is used independently unlike the above-described LOW entry. Hereinafter, a configuration of the LOW entry will now be described with reference to FIG. 5.

FIG. 5 illustrates a LOW entry of the recordable optical disc according to the present invention. Referring to FIG. 5, the LOW entry is allocated with 64 bits, which is similar to the DFL entry, and includes a "Status 1" field, an "Original Cluster first PSN" field, a "Status 2" field, and a "Replacement Cluster first PSN" field. More specifically, a position information of a pre-recorded area in which overwriting of data is to be performed is recorded in the "Original Cluster first PSN" field. And, a position information of a replacement recorded area is recorded in the "Replacement Cluster first PSN" field. In order to be distinguished (or differentiated) from the DFL entry and to indicate that the entry is the LOW entry, a first bit of the "Status 1" field is changed and recorded as a '1000' bit.

Also, in the "Status 2" field, a 'x000' bit indicates an RAD type, which is a replacement type for one defective cluster. And, in the "Status 2" field, in order to express the replacement recording of a plurality of consecutive clusters, a 'x001' bit indicates a start (or beginning) of the LOW entry among the entries of the CRD type, and a 'x010' bit indicates an end of the LOW entry among the entries of the CRD type. Furthermore, among the 4 bits of the "Status 2" field, the first bit is a field for indicating whether replacement recording of the logical overwriting is been performed on the user data area or on the spare area. Herein, when the first bit is '0xxx', replacement recording is performed on the user data area, and when the first bit is '1xxx', the replacement recording is performed on the spare area. An actual recording of the LOW entry, which is recorded as described above, will now be described with reference to FIG. 6.

Figure 6:
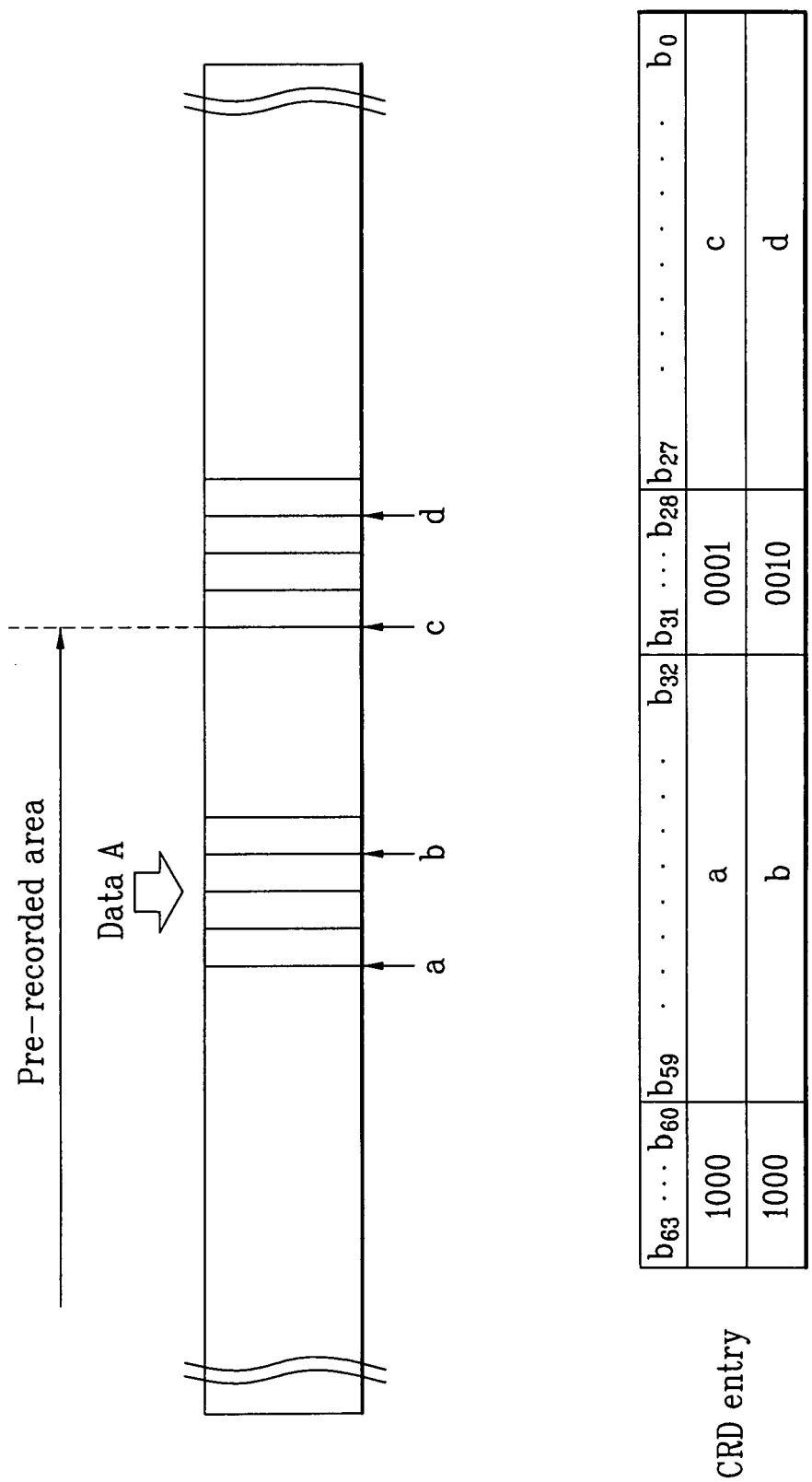
FIG. 6 illustrates a method for recording LOW entry of the recordable optical disc according to the present invention.

FIG. 6 illustrates a method for recording LOW entry of the recordable optical disc according to the present invention. Referring to FIG. 6, when a writing (or recording) command for recording data on a pre-recorded area of the disc is transmitted, the data that is to be recorded on the corresponding area may be replacement recorded on a next recordable (or writable) area within the user data area, as described above. Evidently, the replacement recording may also be performed on the spare area. When the logical overwriting is performed on the recordable high density optical disc, the corresponding position information is recorded in the TDMA as the LOW entry. The example shown in FIG. 6 illustrates the logical overwriting being performed on a plurality of consecutive clusters, and so the LOW entry is recorded as the entry of the CRD type.

As described above, the entry of the CRD type is expressed by using two entries. A '1000' bit representing the LOW entry is recorded in the "Status 1" field of the first entry, and a first physical sector number (PSN) 'a' of the first cluster of the overwritten area is recorded in a next "Original Cluster first PSN" field. Additionally, a '0001' bit indicating a start (or beginning) among the CRD type entries (or the first entry) is recorded in the "Status 2" field, and a first PSN 'c' of the first cluster of the replacement recorded area is recorded in the "Replacement Cluster first PSN" field.

Furthermore, a '1000' representing the LOW entry is recorded in the "Status 2" field of the second entry, and a first PSN 'b' of the last cluster of the overwritten area is recorded in the "Original Cluster first PSN" field. Also, a '0010' bit indicating an end among the CRD type entries (or the second entry) is recorded in the "Status 2" field, and a first PSN 'd' of the last cluster of the replacement recorded area is recorded in the "Replacement Cluster first PSN" field. Since the example of the replacement recording of the logical overwriting being performed on the user data area is illustrated in FIG. 6, the "Status 2" field is recorded as '0xxx' bits. If the replacement recording of the logical overwriting were to be performed on the spare area, the "Status 2" field would be recorded as '1xxx' bits. As described above, by indicating the LOW entry by using one of the 4 bits of the "Status 1" field, the LOW entry can be managed differently from the DFL entry.

Meanwhile, information on the above-described LOW entry is also included in the DFL header information, which will now be described with reference to FIG. 7. FIG. 7 illustrates a DFL header of the recordable optical disc according to the present invention. Referring to FIG. 7, the DFL header is a set of information being recorded in the TDMA as Temporary Defect List (TDFL) information. The TDFL consists of the DFL header and a list of defects, wherein entry information according to the present invention is recorded. Herein, the DFL header includes a "DFL identifier" field, a "DFL format" field, and a "DFL Update Count" field. The DFL header also includes a field indicating the number of each entry.

More specifically, a number of DFL entries is recorded in a "number of DFL entries" field, and a number of RAD and CRD type entries among the DFL entries is recorded in a "number of RAD/CRD entries" field. Additionally, a number of NRD type entries among the DFL entries is recorded in a "number of NRD entries" field, and a total number of LOW entries is recorded in a "number of LOW entries" field. Therefore, by using the above-described DFL header information, the optical disc drive can identify the total number of the required and necessary entries.

FIG. 8 illustrates a LOW entry of the recordable optical disc according to another embodiment of the present invention. Referring to FIG. 8, a '1111' bit is recorded in the "Status 1" field, which differentiates the LOW entry. More specifically, in order to indicate the LOW entry, all of the 4 bits of the "Status 1" field is indicated as '1'. When the "Status 1" field is recorded as '1111', not only can the LOW entry be differentiated from the DFL entry, but also only the LOW entry can be aligned in a separate area from the DFL entry. In other words, all of the DFL entry and the LOW entry are recorded in the list of defects of the TDFL within the TDMA. By recording the "Status 1" field of the LOW entry as '1111' unlike the "Status 1" field of the DFL entry, which is recorded as '0000' or '0001', the LOW entry may be aligned in an area different from the DFL entry.

The first bit of the "Status 1" field is a bit that is irrelevant from the entry alignment. Therefore, when the "Status 1" field is recorded as '1000' in the above-described (or first) embodiment, the entry is simply differentiated from the DFL entry and indicated as the LOW entry. And, as described in the present (or second) embodiment, when the "Status 1" field is recorded as '1111', the LOW entry can even be separately aligned in an area different from the DFL entry. Meanwhile, the remaining "Status 2" field, "Original Cluster first PSN" field, and "Replacement Cluster first PSN" field are used identically as in the first embodiment.

Figure 9:
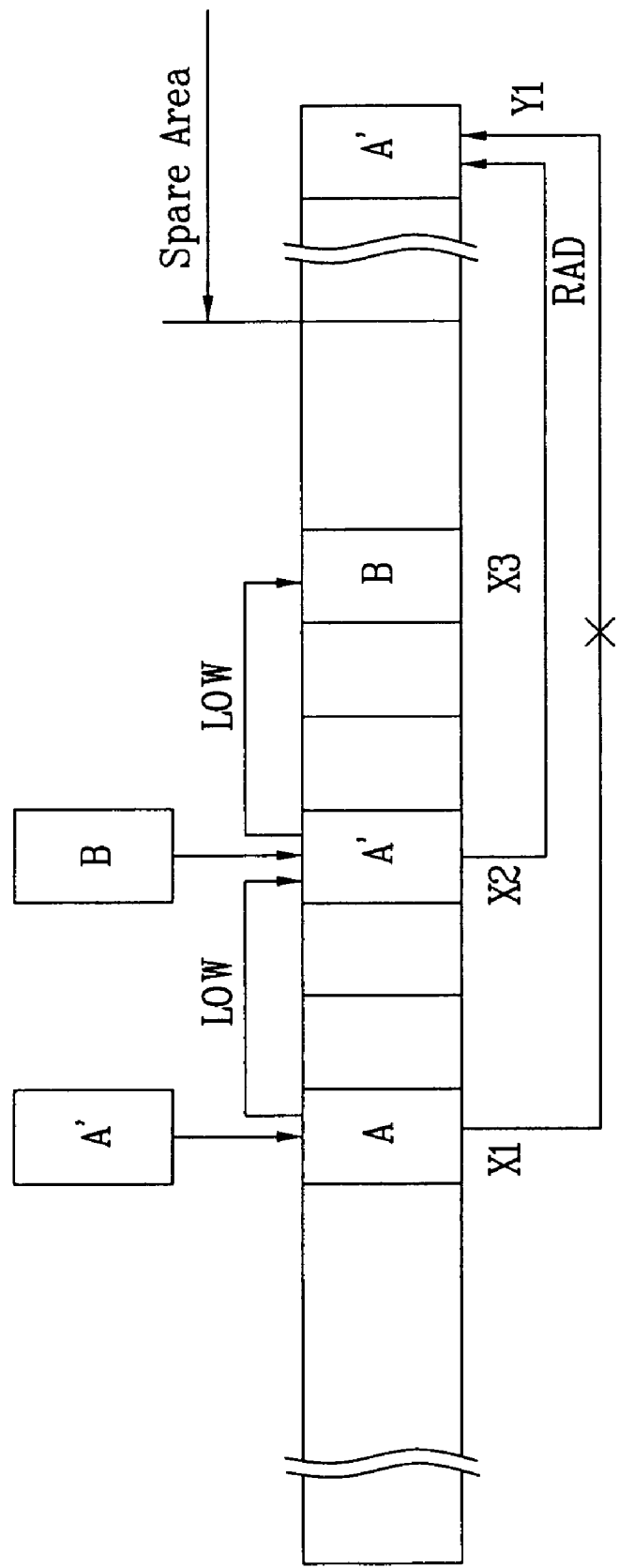
FIG. 9 illustrates an applied example of the LOW entry and the DFL entry according to the present invention.

FIG. 9 illustrates an applied example of the LOW entry and the DFL entry according to the present invention. Particularly, FIG. 9 illustrates an example of logical overwriting or defect management being performed in accordance with the following process steps:

(1) Step 1: logically overwriting data A' for area X1;
(2) Step 2: logically overwriting data B for area X2, wherein replacement recording of the logical overwriting for the area X1 is performed; and
(3) Step 3: when the area X2 is detected as a defect area, replacement recording data to a spare area Y1.

More specifically, when a host initially transmits a writing (or recording) command for recording data A' for area X1 having data A recorded therein, overwriting cannot be performed on the area X1. Therefore, the data A' is replacement recorded on a next recordable area X2. Subsequently, when data B is to be recorded on the area X2, wherein the replacement recording has been performed, in accordance with the host's demand, the data B is replacement recorded on another next recordable area X3 because area X2 is already a data-recorded area. Thereafter, when the area X2 is detected as a defect area, the data A' is replacement recorded on a spare area Y1. Therefore, Step 1 and Step 2 are recorded as the LOW entry, and Step 3 is recorded as the DFL entry.

In this case, when the area X1 is to be reproduced in a later process, the data A' should be reproduced, the data A' being replacement recorded on the area X2 in accordance with the LOW entry of Step 1. However, since the area X2 exists either as a LOW entry replacement recorded on the area X3 or as a defect list replacement recorded on the area Y1, there lies a problem as to which of the two types of the area X3 should be reproduced. More specifically, if the LOW entry and the DFL entry are not differentiated, a problem of having to randomly select any one of the two entries may occur, thereby causing a problem of reproducing the wrong (or incorrect) data. Therefore, the LOW entry and the DFL entry are differentiated according to the present invention. Then, after first selecting the LOW entry, the DFL is selected subsequently.

In other words, referring to FIG. 9, when the host wishes to reproduce the area X1, the LOW entry of Step 1 is selected. Thereafter, when both the LOW entry and the DFL entry exist within the area X2, which is to be reproduced in accordance with the selected entry, the DFL entry is selected. Accordingly, the data A' that is replacement recorded on the spare area Y1 in accordance with the DFL entry existing within the area X2 can be reproduced. And, this instance is when the data A', which is to be overwritten on the initial data A area, is correctly reproduced. Alternatively, when the area X2 is reproduced in accordance with the host's demand, since the LOW entry is first selected according to the present invention, even though both the LOW entry of Step 2 and the DFL entry of Step 3 exist within the area X2, as described above, the data B which is recorded on the area X3 is reproduced in accordance with the LOW entry of Step 3.

Meanwhile, as shown in FIG. 9, when the data that is to be recorded on area X1 is replacement recorded on area X2, and when the data is replacement recorded once again on area Y1, the data initially intended to be recorded on the area X1 is ultimately replacement recorded on the area Y1. Therefore, this may be indicated by using a single entry. More specifically, the data that is to be recorded on the area X1 is recorded as being replacement recorded on the area Y1. Then, the entry of the data of area X1 being replacement recorded on the area X2 and the entry of the data of the area X2 being replacement recorded on the area Y1 are deleted. In order to do so, the actual entry is not recorded due to the characteristics of the recordable high density optical disc. Instead, the entry is temporarily stored in a memory of the optical disc drive, and a position information of the final replacement recording of the data, which is intended to be recorded on the area X1, that is performed on the area Y1 is recorded as an entry. This method is advantageous in reducing waste of entries. However, as shown in FIG. 9, when the DFL entry and the LOW entry commonly exist, it is preferable not to use only one entry. Herein, the area X2 has the identical information as the area Y1, which is to prevent information of the data replacement recorded on the area X2 for the area X1 from being deleted, and to ensure that the DFL entry and the LOW entry are used independently.

Figure 10:
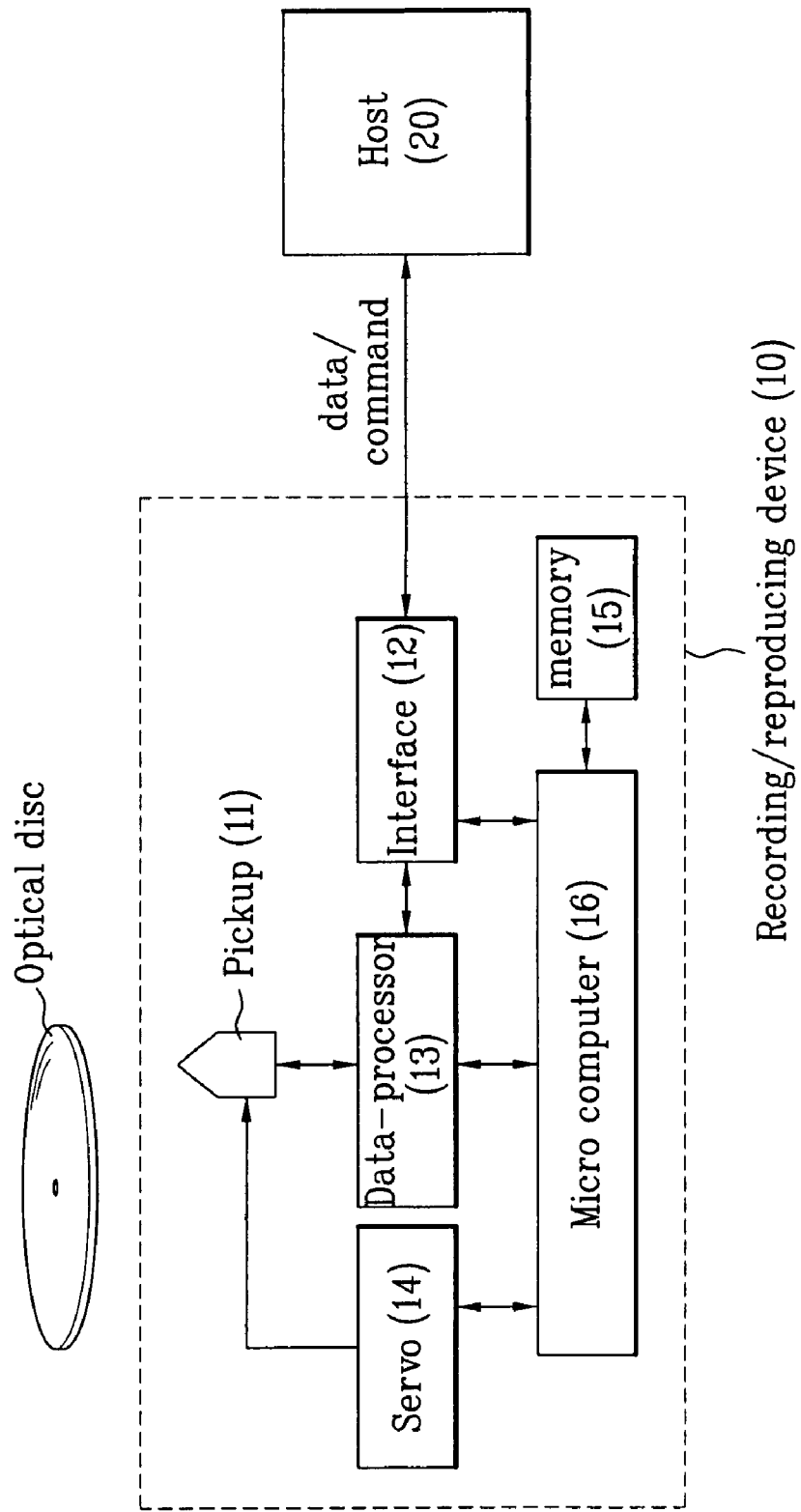
FIG. 10 illustrates a block diagram of an optical recording and reproducing apparatus according to the present invention.

FIG. 10 illustrates a block diagram of an optical recording and/or reproducing apparatus according to the present invention. Referring to FIG. 10, the optical recording and/or reproducing apparatus includes a recording/reproducing device 10 for performing recording/reproduction on the optical disc, and a host, or controller 20 for controlling the recording/reproducing device 10. (Herein, the recording/reproducing device 10 is often referred to as an "optical disc drive", and both terms will be used in the description of the present invention).

More specifically, the host 20 gives a writing or reproduction command to write or reproduce to/from a particular area of the optical disc to the recording/reproducing device 10, and the recording/reproducing device 10 performs the recording and/or reproduction in response to the command from the host 20. The recording/reproducing device 10 includes an interface unit 12 for performing communication, such as exchange of data and order, with the host 20, a pickup unit 11 for writing/reading a data to/from the optical disc directly, a data processor 13 for receiving signal from the pickup unit 11, and recovering a desired signal value, or modulating a signal to be written into a signal able to be written on the optical disc, and forwarding, a servo unit 14 for controlling the pickup unit 11 to read a signal from the optical disc accurately, or write a signal on the optical disc accurately, a memory 15 for temporary storage of various kinds of information including management information, and data, and a microcomputer 16 for controlling various parts of the recording/reproducing device 10.

In the optical recording and/or reproducing apparatus, process steps of the method for recording data on the recordable optical disc will now be described. Upon inserting the recordable optical disc into the optical recording and/or reproducing apparatus, all management information is read from the optical disc and stored in the memory 15 of the recording/reproducing device 10, for use at the time of recording/reproduction of the optical disc. Herein, if the user desires to write on a particular area of the optical disc, the host 20, which considers such desire of the user as a writing command, provides information on a desired writing position to the recording/reproducing device 10, along with a set of data that is to be written.

At this point, the microcomputer 16 within the recording/reproducing device 10 receives the writing command and controls operations so that recording of data can be performed on the optical disc in accordance with the writing command. When overwriting is to be performed in accordance with the host's command during or after the recording of data, the data that is to be recorded on the overwriting area is replacement recorded on a non-recorded area within the data zone. Then, the position information of the overwritten area and the replacement recorded area is recorded on the TDFL within the TDMA as the LOW entry. Moreover, when a defect area is detected during or after the recording of data, the data that is to be recorded or already recorded on the defect area is replacement recorded on the spare area within the data zone. Thereafter, the position information of the defect area and the replacement recorded area are recorded on the TDFL within the TDMA as the DFL entry. Then, the microcomputer 16 provides the position information of the replacement recorded area and the data according to the command of the host to the servo unit 14 and the data-processor 13, so that the recording or replacement recording is completed, at a desired position on the optical disc through the pickup unit 11.

Hereinafter, a method for reproducing data, which is recorded as described above, from the recordable optical disc according to the present invention will be described in detail. When the recordable optical disc, wherein the data is recorded, is inserted into the optical recording and/or reproducing apparatus, all management information is read from the optical disc and stored in the memory 15 of the recording/reproducing device 10, for use at the time of recording/reproduction data on/from the optical disc.

Herein, if the user desires to read (or reproduce) data from a particular area of the optical disc, the host 20, which considers such desire of the user as a reading command, provides information on a desired reading position to the recording/reproducing device 10. Then, the microcomputer 16 in the recording/reproducing device 10 receives the reading command and determines whether the data on the area of the optical disc, from which the host 20 desires to read the data, is replacement recorded on another area within the data zone. This can be verified by using the above-described LOW and DFL entries, which are recorded on the TDFL within the TDMA. Therefore, when the replacement recording is not performed on the area desired by the host 20 for reproduction, the microcomputer 16 reads (or reproduces) the data of the corresponding area and transmits the read information to the host 20. If replacement recording has been performed on another area, the microcomputer 16 reads the data from the corresponding replacement area and transmits the read information to the host 20.

As described above, the method and apparatus of recording data on the recording medium according to the present invention have the following advantages. The LOW and DFL entries are differentiated and managed accordingly, thereby enhancing the recording and reproducing efficiency of the data on/from the optical recording medium.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording management information on a computer-readable recording medium, the method comprising:

performing a first replacement recording by recording first data in a first replacement area when a command for overwriting the first data in a first area is received, the first area being a pre-recorded area, the first replacement area being defective, the first replacement recording generating a first temporary entry;

performing a second replacement recording by recording the first data in a second replacement area instead of the first replacement area, the second replacement recording generating a second temporary entry;

generating a defect entry based on the first temporary entry and the second temporary entry, the defect entry being management information for managing the first replacement recording and the second replacement recording; and recording, in a management area of the computer-readable recording medium, the generated defect entry, the defect entry including, first location information indicating a location of the first area based on the first temporary entry, and second location information indicating a location of the second replacement area based on the second temporary entry, wherein the defect entry does not include location information on the defective first replacement area, and wherein the defect entry further includes status information for indicating whether the first area requested to be overwritten is one cluster or a plurality of consecutive clusters, wherein if the first area is a plurality of consecutive clusters, a pair of defect entries is recorded in the management area, wherein one of the pair of defect entries includes first location information indicating a location of a first cluster of the first area and second location information indicating a location of a first cluster of the second replacement area, and the other of the pair of defect entries includes first location information indicating a location of a last cluster of the first area and second location information indicating a location of a last cluster of the second replacement area.

2. The method of claim 1, wherein first temporary entry includes location information indicating the location of the first area and a location of the first replacement area so as to indicate that the first area is replaced with the first replacement area.

3. The method of claim 1, wherein the first temporary entry is temporarily stored in a memory included in a recording apparatus.

4. The method of claim 1, wherein the second temporary entry includes location information indicating the location of the first replacement area and the location of the second replacement area so as to indicate that the first replacement area is replaced with the second replacement area.

5. The method of claim 4, wherein the second temporary entry is temporarily stored in a memory included in a recording apparatus.

6. The method of claim 1, wherein the first replacement area is located in a user data area of the computer-readable medium.

7. The method of claim 1, wherein the second replacement area is located in a spare area of the computer-readable medium.

8. An apparatus of recording management information on a recording medium, the apparatus comprising:
- an optical pickup configured to record data on the recording medium; and
- a microcomputer operatively coupled to the optical pickup, the microcomputer configured to,
    - perform a first replacement recording by controlling the optical pickup to record first data in a first replacement area when a command for overwriting the first data in a first area is received, the first area being a pre-recorded area, the first replacement area being defective, the first replacement recording generating a first temporary entry,
    - perform a second replacement recording by controlling the optical pickup to record the first data in a second replacement area instead of the first replacement area, the second replacement recording generating a second temporary entry,
    - generate a defect entry based on the first temporary entry and the second temporary entry, the defect entry being management information for managing the first replacement recording and the second replacement recording, and
    - control the optical pickup to record the generated defect entry in a management area of the recording medium, the generated defect entry including,
        - first location information indicating a location of the first area based on the first temporary entry, and
        - second location information indicating a location of the second replacement area based on the second temporary entry,
        - wherein the defect entry does not include location information on the defective first replacement area, and
        - wherein the defect entry further includes status information for indicating whether the first area requested to be overwritten is one cluster or a plurality of clusters
        - wherein if the first area is a plurality of consecutive clusters, a pair of defect entries is recorded in the management area, wherein one of the pair of defect entries includes first location information indicating a location of a first cluster of the first area and second location information indicating a location of a first cluster of the second replacement area, and the other of the pair of defect entries includes first location information indicating a location of a last cluster of the first area and second location information indicating a location of a last cluster of the second replacement area.

9. The apparatus of claim 8, wherein the first temporary entry includes location information indicating the location of the first area and a location of the first replacement area so as to indicate that the first area is replaced with the first replacement area.

10. The apparatus of claim 8, wherein the second temporary entry includes location information indicating the location of the first replacement area and the location of the second replacement area so as to indicate that the first replacement area is replaced with the second replacement area.

11. The apparatus of claim 10, further comprising:
- a memory configured to store the first temporary entry and the second temporary entry.

12. The apparatus of claim 8, wherein the first replacement area is located in a user data area of the recording medium.

13. The apparatus of claim 8, wherein the second replacement area is located in a spare area of the recording medium.

14. A method of reproducing data from a computer-readable medium, the method comprising:
- reproducing, from a management area of the computer-readable medium, an entry recorded in the management area as management information managing a first replacement recording and a second replacement recording, the second replacement recording performed after the first replacement recording, the entry including,
    - first location information indicating a location of a first area based on the a first temporary entry, the first temporary entry being generated by the first replacement recording, and
    - second location information indicating a location of a second replacement area based on a second temporary entry, the second temporary entry being generated by the second replacement recording, the first area being replaced with a first replacement area, the first replacement area being replaced with the second replacement area, the first area being a pre-recorded area, the first replacement area being defective,
    - wherein the entry does not include location information on the defective first replacement area, and
    - wherein the entry further includes status information for indicating whether the first area requested to be overwritten is one cluster or a plurality of consecutive clusters; and
- reproducing data recorded on the second replacement area based on the entry when a command for reproducing data recorded in the first area is received and the entry is present,
- wherein if the first area is a plurality of consecutive clusters, a pair of defect entries is recorded in the management area, wherein one of the pair of defect entries includes first location information indicating a location of a first cluster of the first area and second location information indicating a location of a first cluster of the second replacement area, and the other of the pair of defect entries includes first location information indicating a location of a last cluster of the first area and second location information indicating a location of a last cluster of the second replacement area.

15. The method of claim 14, wherein the first replacement area is located in a user data area of the computer-readable medium.

16. The method of claim 15, wherein the second replacement area is located in a spare area of the computer-readable medium.

17. An apparatus of reproducing data from a computer-readable medium, the apparatus comprising:
- an optical pickup configured to read data from the recording medium; and
- a microcomputer, operatively coupled to the optical pickup, the microcomputer configured to,
    - control the optical pickup to reproduce, from a management area of the computer-readable medium, an entry recorded in the management area as management information managing a first replacement recording and a second replacement recording, the second replacement recording performed after the first replacement recording, the entry including,
        - first location information indicating a location of a first area based on a first temporary entry, the first temporary entry being generated by the first replacement recording, and
        - second location information indicating a location of a second replacement area based on a second temporary entry, the second temporary entry being generated by the second replacement recording, the first area being replaced with a first replacement area the first replacement area being replaced with the second replacement area, the first area being a pre-recorded area, the first replacement area being defective, wherein the entry does not include location information on the defective first replacement area, and wherein the entry further includes status information for indicating whether the first area requested to be overwritten is one cluster or a plurality of consecutive clusters, and control the optical pickup to reproduce data recorded on the second replacement area based on the entry if data recorded in the first area is to be reproduced and the entry is present, wherein if the first area is a plurality of consecutive clusters, a pair of defect entries is recorded in the management area, wherein one of the pair of defect entries includes first location information indicating a location of a first cluster of the first area and second location information indicating a location of a first cluster of the second replacement area, and the other of the pair of defect entries includes first location information indicating a location of a last cluster of the first area and second location information indicating a location of a last cluster of the second replacement area.

18. The apparatus of claim 17, wherein the first replacement area is located in a user data area of the computer-readable medium.

19. The apparatus of claim 18, wherein the second replacement area is located in a spare area of the computer-readable medium.

20. A non-transitory computer-readable medium, comprising:

a data area including,
  a first replacement area for storing first data as a first replacement recording when a command for overwriting the first data in a first area is received;
  a second replacement area for storing the first data as a second replacement recording, the first area being a pre-recorded area, the first replacement area being defective; and a management area configured to store an entry as management information managing the first replacement recording and the second replacement recording, the entry including,
  first location information indicating a location of the first area based on a first temporary entry, the first temporary entry being generated by the first replacement recording, and
  second location information indicating a location of the second replacement area based on a second temporary entry, the second temporary entry being generated by the second replacement recording, wherein the entry does not include location information on the defective first replacement area, and wherein the entry further includes status information for indicating whether the first area requested to be overwritten is one cluster or a plurality of consecutive clusters, wherein if the first area is a plurality of consecutive clusters, a pair of defect entries is recorded in the management area, wherein one of the pair of defect entries includes first location information indicating a location of a first cluster of the first area and second location information indicating a location of a first cluster of the second replacement area, and the other of the pair of defect entries includes first location information indicating a location of a last cluster of the first area and second location information indicating a location of a last cluster of the second replacement area.

21. The non-transitory computer-readable medium of claim 20, wherein the data area includes a user data area and a spare area, and wherein the first replacement area is located in the user data area of the non-transitory computer-readable medium.

22. The non-transitory computer-readable medium of claim 20, wherein the data area includes a user data area and a spare area, and wherein the second replacement area is located in the spare area of the non-transitory computer-readable medium.

* * * * *